United States Patent [19]
Ginder et al.

[11] Patent Number: 5,351,319
[45] Date of Patent: Sep. 27, 1994

[54] FERROFLUID SWITCH FOR A LIGHT PIPE

[75] Inventors: John M. Ginder, Plymouth; Jeffrey T. Remillard; Willes H. Weber, both of Ann Arbor, all of Mich.

[73] Assignee: Ford Motor Company, Dearborn, Mich.

[21] Appl. No.: 151,675

[22] Filed: Nov. 15, 1993

[51] Int. Cl.⁵ .................................................. G02B 6/20
[52] U.S. Cl. ............................................ 385/6; 385/31; 385/125
[58] Field of Search .................... 385/6, 16, 23, 18, 19, 385/21, 22, 4, 5, 125, 31, 147

[56] References Cited

U.S. PATENT DOCUMENTS

| | | | |
|---|---|---|---|
| 3,995,934 | 12/1976 | Nath | 385/125 |
| 4,121,884 | 10/1978 | Greenwood | 385/23 |
| 4,201,446 | 5/1980 | Geddes et al. | 385/125 |
| 4,384,761 | 5/1983 | Brady | 385/16 |
| 4,834,497 | 5/1989 | Angel | 385/31 |
| 5,182,791 | 1/1993 | Pollack | 385/147 |

OTHER PUBLICATIONS

"Ferrofluids Physical Properties and Applications" Ferrofluids Corporation, 40 Simon St., Nashua, N.H., 03060 1986 (No Month).

Primary Examiner—John D. Lee
Assistant Examiner—Phan Thi Heartney
Attorney, Agent, or Firm—Mark L. Mollon; Roger L. May; Kevin G. Mierzwa

[57] ABSTRACT

A ferrofluid controlled switch for a light pipe has a light pipe having a first index of refraction, a fluid responsive to a magnetic field having a second index of refraction, and an enclosure concentrically located around at least a portion of the light pipe for retaining the fluid such that the fluid is capable of assuming two configurations, one adjacent to the light pipe and one separate from the light pipe. A controllable magnetic field device such as a permanent magnet or wire coils are used to transfer the magnetically responsive fluid between said two configurations to reduce the output of the light pipe when the fluid is adjacent to the light pipe.

20 Claims, 2 Drawing Sheets

FERROFLUID SWITCH FOR A LIGHT PIPE

BACKGROUND OF THE INVENTION

The present invention relates generally to a switch for a light pipe, and more specifically to a device for modulating the intensity of light travelling through a light pipe using ferrofluid to scatter the evanescent field of the light in the light pipe.

In the operation of light pipes it is often desirable to control the intensity of the light propagating in the light pipe. When using high intensity discharge lamps as the light source for light distribution via light pipes, it is desirable to control the light in the light pipe without modulating the light source. Several methods have been used in the past to control the modulation of the light through the light pipe.

A light switch using ferrofluid is described in U.S. Pat. No. 4,384,761. The light pipe is physically separated by a chamber containing ferrofluid. When the coil near the end of the light pipe is energized, the two light pipes cease to be optically coupled. Several problems exist with a system that breaks the continuity of the light pipe. For example, the intensity of propagating light is reduced when the light travels through media with different indices of refraction.

Another light switch is described in commonly owned U.S. patent application Ser. No. 07/980,066 issued on May 3, 1994, U.S. Pat. No. 5,317,667 that uses electrophoresis to control the modulation of light in the pipe without breaking continuity of the light pipe. The present invention seeks further improvements in manufacturability.

SUMMARY OF THE INVENTION

It is a primary advantage of the present invention that light modulation is achieved without breaking the optical continuity of the light pipe in an easily manufactured switch.

A preferred embodiment of the present invention includes a light pipe having a first index of refraction, fluid responsive to a magnetic field having a second index of refraction, and an enclosure concentrically located around at least a portion of the light pipe for retaining the fluid so that the fluid is capable of assuming two configurations, one adjacent to the light pipe and one separate from the light pipe. A controllable magnetic field device such as a permanent magnet or wire coils are used to transfer the magnetically responsive fluid between the two configurations to selectably reduce the light transmission of the light pipe when the fluid is adjacent to the light pipe.

DETAILED DESCRIPTION OF THE PREFERRED EMBODIMENT

Figure 1:
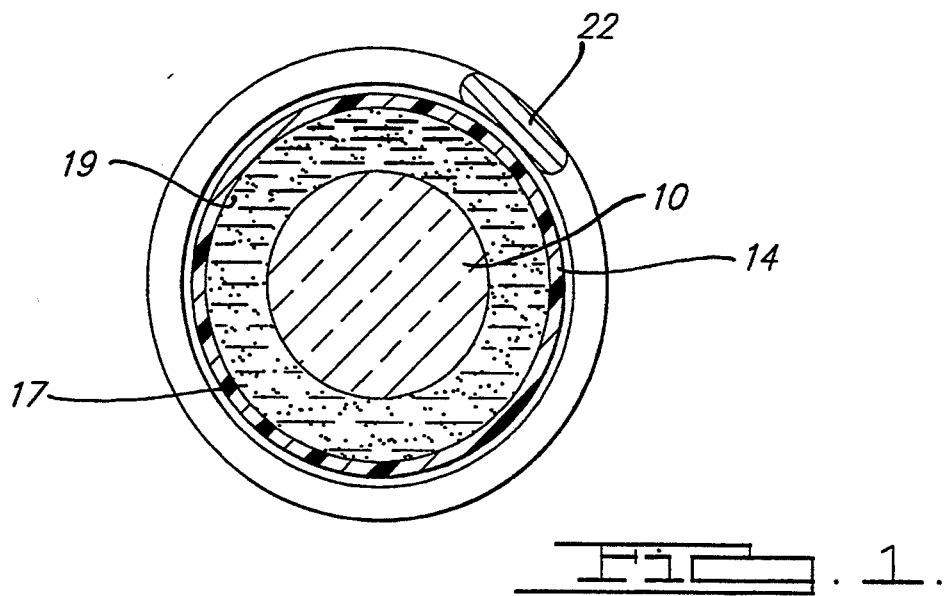
FIG. 1 is an axial cross section of a light pipe of the present invention.
Figure 2:
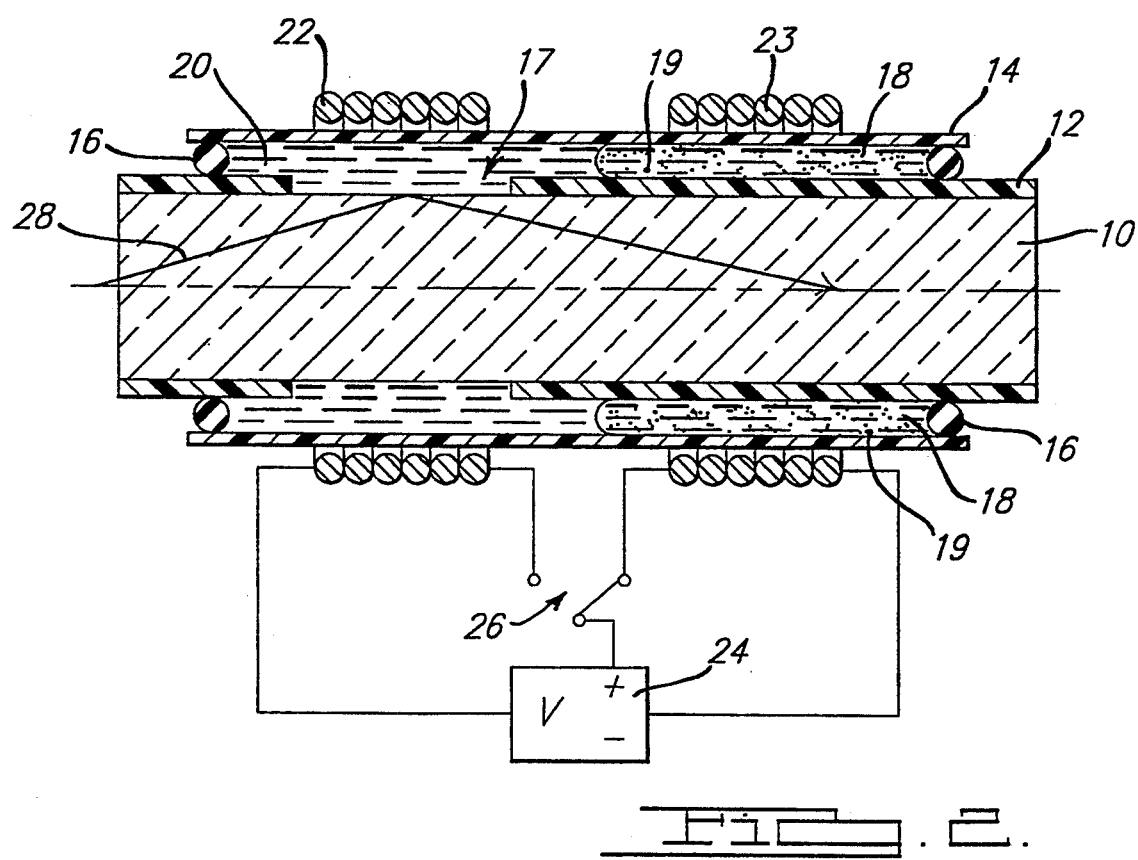
FIG. 2 is a longitudinal cross section of a light pipe of the present invention in the on state.
Figure 3:
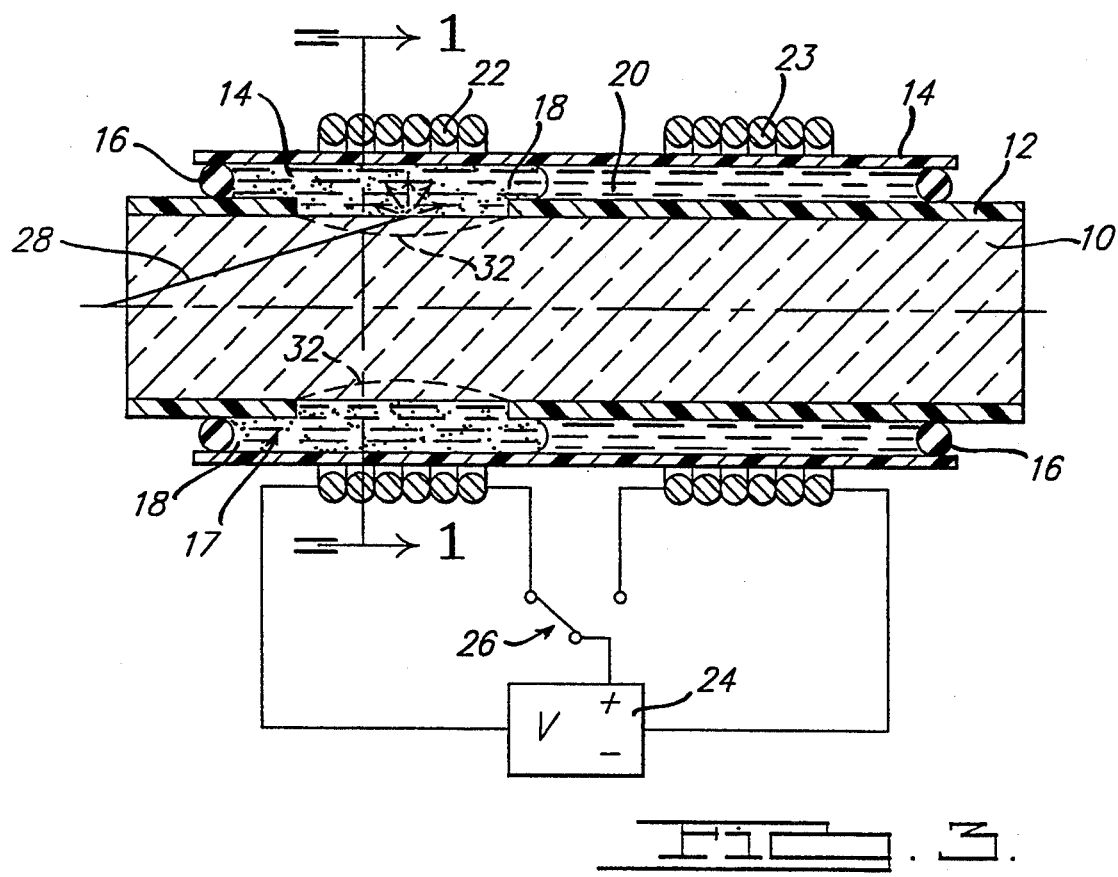
FIG. 3 is a longitudinal cross section of a light pipe of the present invention in the off state.

Referring now to FIGS. 1, 2, and 3 light pipe 10 is a cylindrical optic element made of a common material such as plastic or glass. Light pipe 10 has an insulative cladding 12 applied thereto which is removed at the location of a switch for controlling light transmission. A typical light pipe made by the Lumenyte Corp. having a light pipe index of refraction of 1.48 and a cladding index of refraction 1.33 may be employed. Light pipe 10 as shown in FIGS. 1-3 is shown as being straight for simplicity; however, it would also be within the scope of the invention to form the switch on a curved portion of a light pipe.

A cylindrical outer enclosure 14 concentrically surrounds light pipe 10 forming a space therebetween. Outer enclosure 14 is made of a rigid non-magnetic material such as plastic, glass or metal. Plastic is preferred because it has the desired property of being easily workable. The inner surface of outer enclosure 14 if not inherently light absorbing is coated with an absorbing layer such as black paint to prevent light reflection. Outer enclosure 14 is held in a fixed location with respect to light pipe 10 by a pair of gaskets 16. A chamber 17, defined by light pipe 10, outer enclosure 14 and gaskets 16, is filled with a mixture 15 of ferrofluid 18 and buoyant fluid 20. Buoyant fluid 20 and ferrofluid 18 must remain immiscible (separated) throughout the operating conditions of the switch.

Ferrofluid 18 is magnetically permeable and thus is drawn toward magnetic fields, even fields of relatively low magnetic field strengths. Ferrofluids are described in a brochure entitled "Ferrofluids—Physical Properties and Applications", published by Ferrofluidics Corporation Nashua, N.H. They may be either hydrocarbon based or water based. In particular, ferrofluid 18 is a colloidal suspension having very small (typically <10 nm in diameter) ferromagnetic particles 19. The size of particles 19 allows them to interact strongly with the light, yet allows them to make close contact with the surface of the light pipe 10. Particles 19 are coated with a stabilizing dispersing agent which prevents particle agglomeration even when a strong magnetic field is applied to the ferrofluid. When mixture 15 is subjected to a magnetic field, ferrofluid 18 is driven towards the magnetic field. Ferrofluid 18 has the desirable physical properties of relatively low viscosity and is stabilized against sedimentation of the magnetic particles contained therein. It is preferred that if a glass light pipe 10 is used, inner walls of outer enclosure 14 and the uncladded surface of light pipe 10 are treated with a coupling liquid such as dodecyltriclorosilane to prevent ferrofluid 18 from attaching (sticking) to light pipe 10 and outer enclosure 14.

Buoyant fluid 20 is preferably a transparent, non-conducting liquid whose refractive index is comparable to or slightly smaller than cladding 11 and remains in a liquid state through the operating range of the device, which for automotive applications is $-40°$ C. to $80°$ C. Buoyant fluid is not essential to the operation of the switch, however, it is preferred because it facilities the movement of ferrofluid 18 within the switch by providing a buoyant environment. The composition of buoyant fluid 20 depends on the type of ferrofluid 18 used. For example, buoyant fluid 20 can be a common low-index hydrophilic liquid like water, alcohol, or acetonitrile if the ferrofluid is hydrocarbon-based. If the ferrofluid 18 is water based, hydrophobic liquids such as silicones and hydrocarbons are appropriate. One example of a hydrophobic liquid is dodecane.

A controllable magnetic field means is used to control the movement of ferrofluid 18 in chamber 17. The magnetic field means is preferably comprised of two coils, however, a movable permanent magnet can also be used. The coils are adjacent chamber 17 to create a magnetic field in the chamber when energized. When energized, first coil 22 attracts ferrofluid 18 to the end of chamber 17 where cladding 12 has been removed from light pipe 10, thereby reducing light transmission. When second coil 23 is energized and first coil 22 is deenergized, ferrofluid 18 is attracted to the end of chamber 17 where cladding has not been removed, thereby providing an on state. The coils can alternatively be incorporated integrally within outer enclosure 14 or insulative cladding 12. Second coil 23 can also be eliminated if a fast switching time is not desired.

In the preferred embodiment, the switch is manufactured by first stripping the cladding material from a portion of commercially available light pipe. The length of the switch may vary depending on the actual material used and the intensity of the output desired. For example, a switch according to FIGS. 1–3 was constructed approximately 4.5 cm. in length on a light pipe having a 1 cm. diameter. Outer enclosure 14 having a diameter larger than light pipe 10 (e.g., 1.5 cm.) is then placed concentrically around light pipe 10 in a sleeve-like manner. Outer enclosure 14 is held in place by a gasket 16 placed at one end of the switch. Chamber 17 is filled with ferrofluid 18 and buoyant fluid 20. The other end of the switch is then sealed with another gasket 16 to hold outer enclosure 14 and the fluids in place. The width of gaskets 16 in the preferred embodiment is 1 mm. The thickness can be reduced to the thickness of the evanescent field (discussed below). First coil 22 and second coil 23 are then placed concentrically around outer enclosure 14.

As an alternative method of assembly, the switch can be fully assembled without the fluids. The fluids can be injected into a sealable hole in outer enclosure 14.

The switches may be manufactured on an existing light pipe or made separately and butt-coupled into an existing light pipe. Butt-coupling switches into a light pipe wherein the refractive index is the same as that in the switch will not cause reflective losses to occur.

Referring now to FIG. 2, the light switch further includes a toggle switch 26 and a voltage source 24. Switch 26 is a relay or solid state switch. Voltage source 24 is an automobile battery, for example. Switch 26 selectably couples voltage source 24 to either first coil 22 or second coil 23. FIG. 2 illustrates the case where second coil 23 is energized by voltage source 24. The light switch is in the on state, (i.e., the light output of the light pipe is not reduced by the switch). The buoyant fluid/light pipe boundary causes the light rays travelling within light pipe 10 to internally reflect within light pipe 10.

Referring now to FIG. 3, first coil 22 is energized through switch 26. The light switch is in the off state, (i.e., the light output of the light pipe is reduced by the switch). Ferrofluid 18 is attracted to the end of light pipe 10 where cladding 12 is removed. Particles 19 scatter and/or absorb light rays in light pipe 10 that would normally undergo internal reflection. The propagating light enters ferrofluid 18 creating an evanescent field of light around inner conductor 12 extending 0.1 to 0.5 microns into ferrofluid 18. The field of light interacts with the particles 19 which reduce the light propagating down the light pipe 10.

Figure 4:
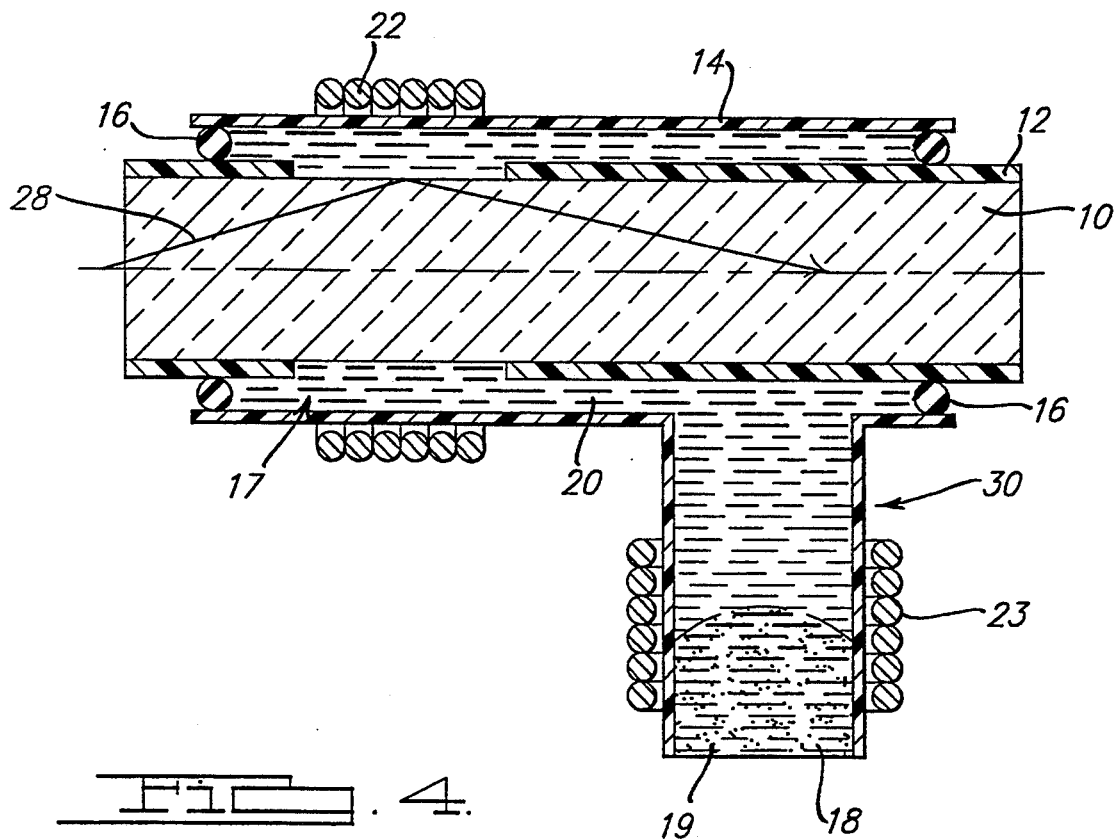
FIG. 4 is an alternative embodiment of the present invention having the fluid reservoir in an alternative position.

Referring now to FIG. 4, an alternative placement of second coil 23 is shown. A reservoir 30 is formed in outer enclosure 14 rather than coaxially as shown in FIGS. 1–3. Second coil 23 is placed around reservoir 30 to control the off state.

As shown in FIG. 3, to increase the efficiency of the switch, a gentle curve 32 can be place in the light pipe to ensure light propagating down light pipe 10 contacts the area of the switch at least once. Another method to ensure at least one reflection at the switch would be to form light pipe 10 into a slight arc and form the switch around it.

Many variations from the described invention would be apparent to those skilled in the art. For example, light pipe 10 can take the form of a fiber optic. Also, dye molecules can be added to the fluids to increase their light absorption.

What is claimed is:

1. A device for modulating light output of a light pipe comprising:

a light pipe having a first index of refraction;

fluid responsive to a magnetic field having a second index of refraction;

retaining means concentrically located around at least a portion of said light pipe for retaining said fluid so that said fluid is capable of assuming two configurations, one adjacent to said light pipe and one separate from said light pipe; and controllable magnetic field means for transferring said magnetically responsive fluid between said two configurations, whereby the output of said light pipe is reduced when said fluid is adjacent to said light pipe.

2. The device as in claim 1 wherein said retaining means comprises a cylindrical walled member concentrically located about said light pipe and a pair of O-rings disposed at opposite ends of said cylindrically walled member forming a chamber for receiving said fluid.

3. The device as recited in claim 2 wherein said light pipe includes an insulative cladding surrounding said light pipe, said cladding containing a discontinuity around said light pipe in said chamber so that when said magnetic fluid is separate from said light pipe said magnetic fluid between said cladding and said retaining means.

4. The device as recited in claim 3 wherein said controllable magnetic field means comprises a first coil concentrically located about said light pipe.

5. The device as recited in 4 wherein said first coil is located adjacent to the portion of said light pipe having cladding removed.

6. The device as recited in claim 5 wherein said controllable magnetic means comprises a second coil spaced apart from said first coil and adjacent to a portion of said light pipe having cladding.

7. The device as recited in claim 6 wherein said first and second coils are located within said chamber.

8. The device as recited in claim 6 wherein said first and second coils are adjacent to said cylindrically walled member.

9. The device as recited in claim 6 wherein said second coil is located concentrically around said walled member in the portion of said light pipe having cladding so that when said second coil is energized, the output of said light pipe is not reduced and when said first coil is energized the output of said light pipe is reduced.

10. The device as recited in claim 3 wherein said portion of said light pipe having said cladding removed within said chamber has a curved portion formed in the outer surface of said light pipe by reducing the diameter of said light pipe.

11. The device as recited in claim 1 wherein said fluid responsive to a magnetic field comprises ferrofluid.

12. The device as recited in claim 11 further comprising an immiscible non-magnetic fluid, said non-magnetic fluid also retained within said retaining means.

13. The device as recited in claim 12 wherein said ferrofluid is water-based.

14. The device of claim 13 wherein said non-magnetic fluid is hydrophobic.

15. The device as recited in 12 wherein said ferrofluid comprises hydrocarbon base.

16. The device as recited in claim 12 wherein said nonmagnetic fluid has a third index of refraction less than or equal to said first index of refraction.

17. The device as recited in claim 1 wherein said light pipe and said retaining means are treated with a liquid coupling agent to prevent fluid from coating said light pipe and said retaining means.

18. The device as recited in claim 1 wherein said controllable magnetic field means comprises a permanent magnet.

19. A method for controlling the light output of a light pipe having a first index of refraction, fluid responsive to a magnetic field having a second index of refraction, a non-magnetic fluid immiscible in said magnetic fluid, retaining means concentrically located around at least a portion of said light pipe for retaining said fluids such that said magnetic fluid is capable of assuming two configurations, one adjacent to said light pipe and one separate from said light pipe and a controllable magnetic field means for causing said magnetically responsive fluid to assume one of said configurations, comprising the step of:

energizing said controllable magnetic field means to control the movement of said fluid between said two configurations whereby when said fluid is adjacent to said light pipe the output of said light pipe is reduced.

20. The method of claim 19 further comprising the steps of:

creating an evanescent field by the interaction of the light in said light pipe with the fluid; and absorbing the light created by the evanescent field said non-magnetic solution thereby reducing the light output of the light pipe.

* * * * *